G. C. PURDY & D. W. EDWARDS.
TIE BORING MACHINE.
APPLICATION FILED APR. 1, 1913.

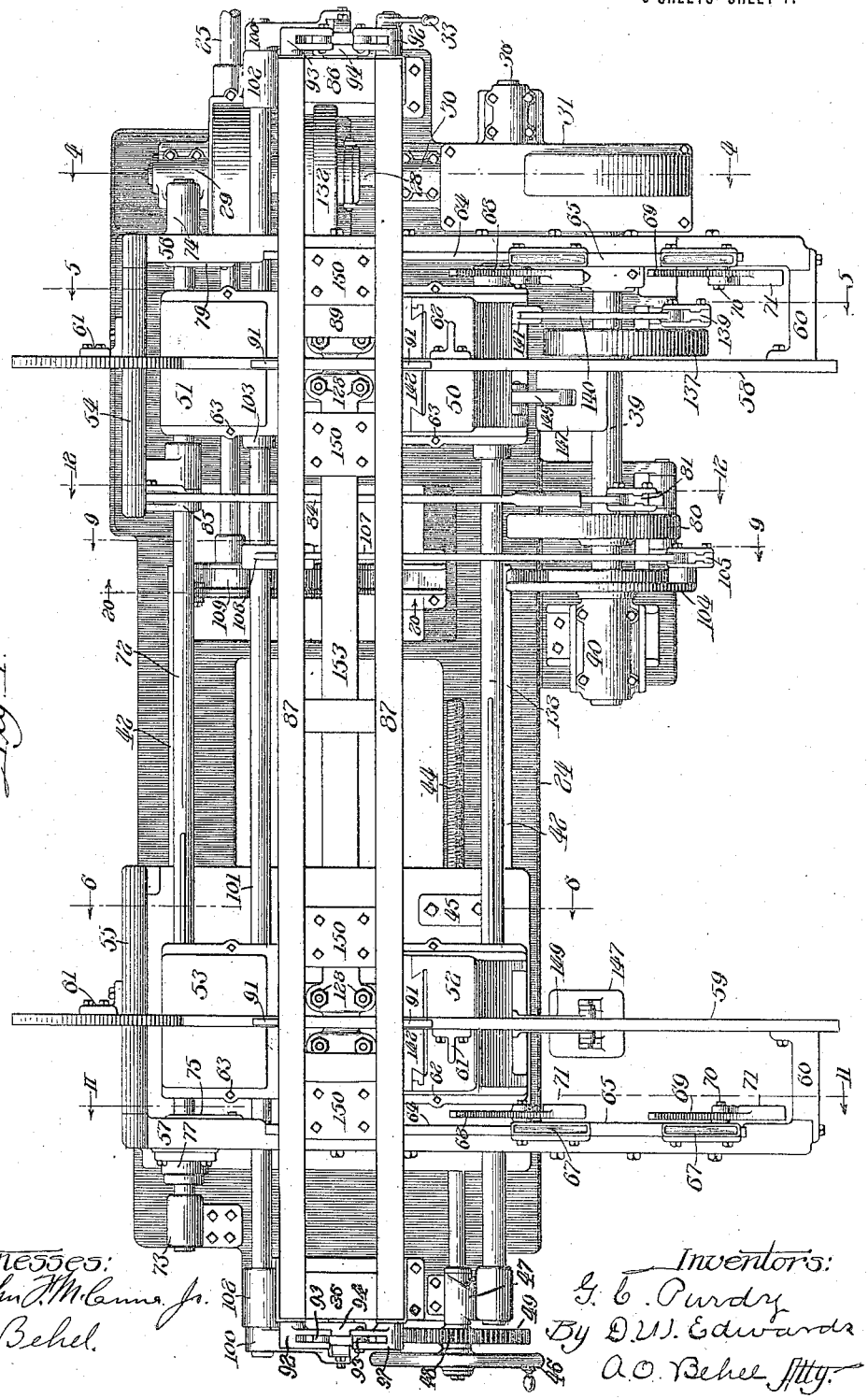

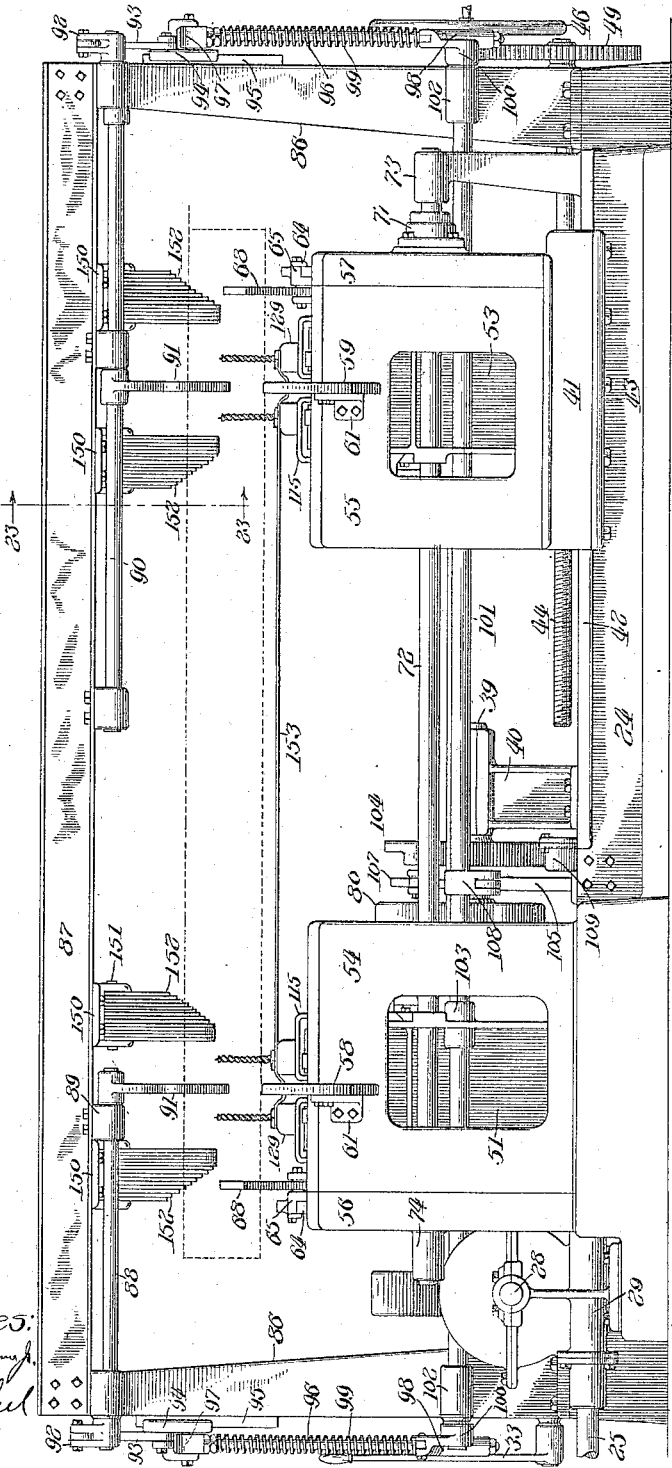

1,195,852.

Patented Aug. 22, 1916.
9 SHEETS—SHEET 3.

Witnesses:
Inventors:
G. C. Purdy
D. W. Edwards

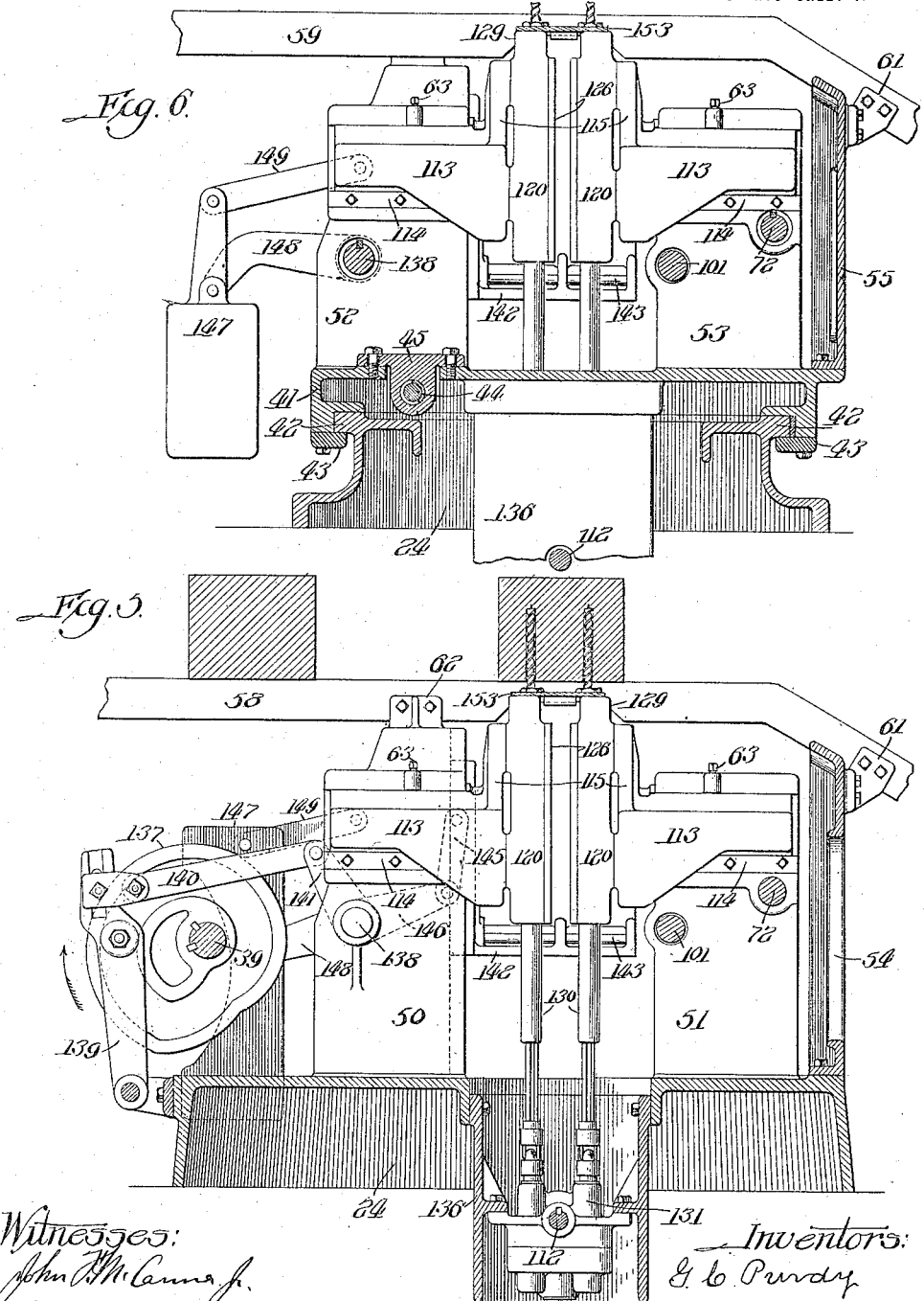

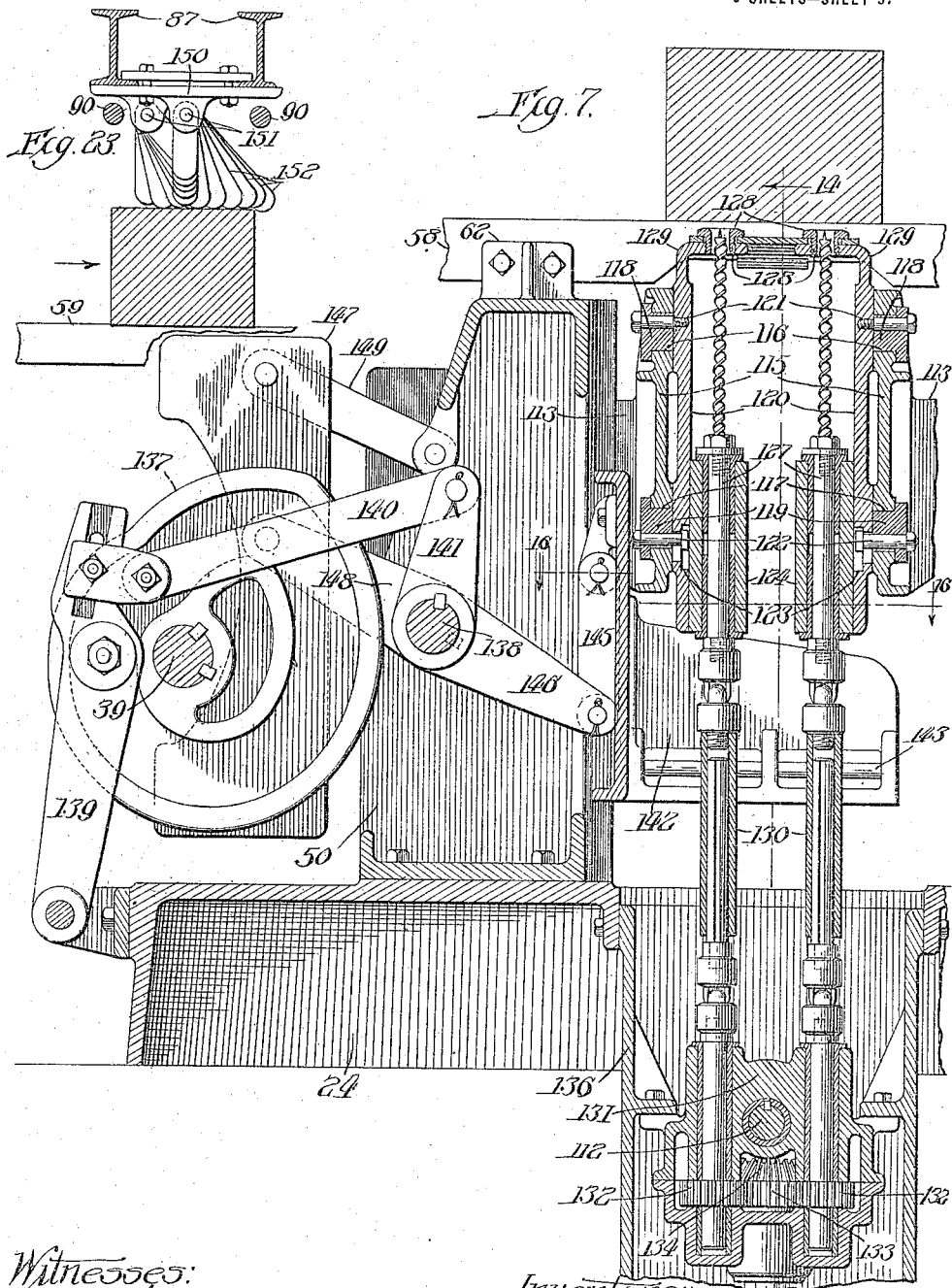

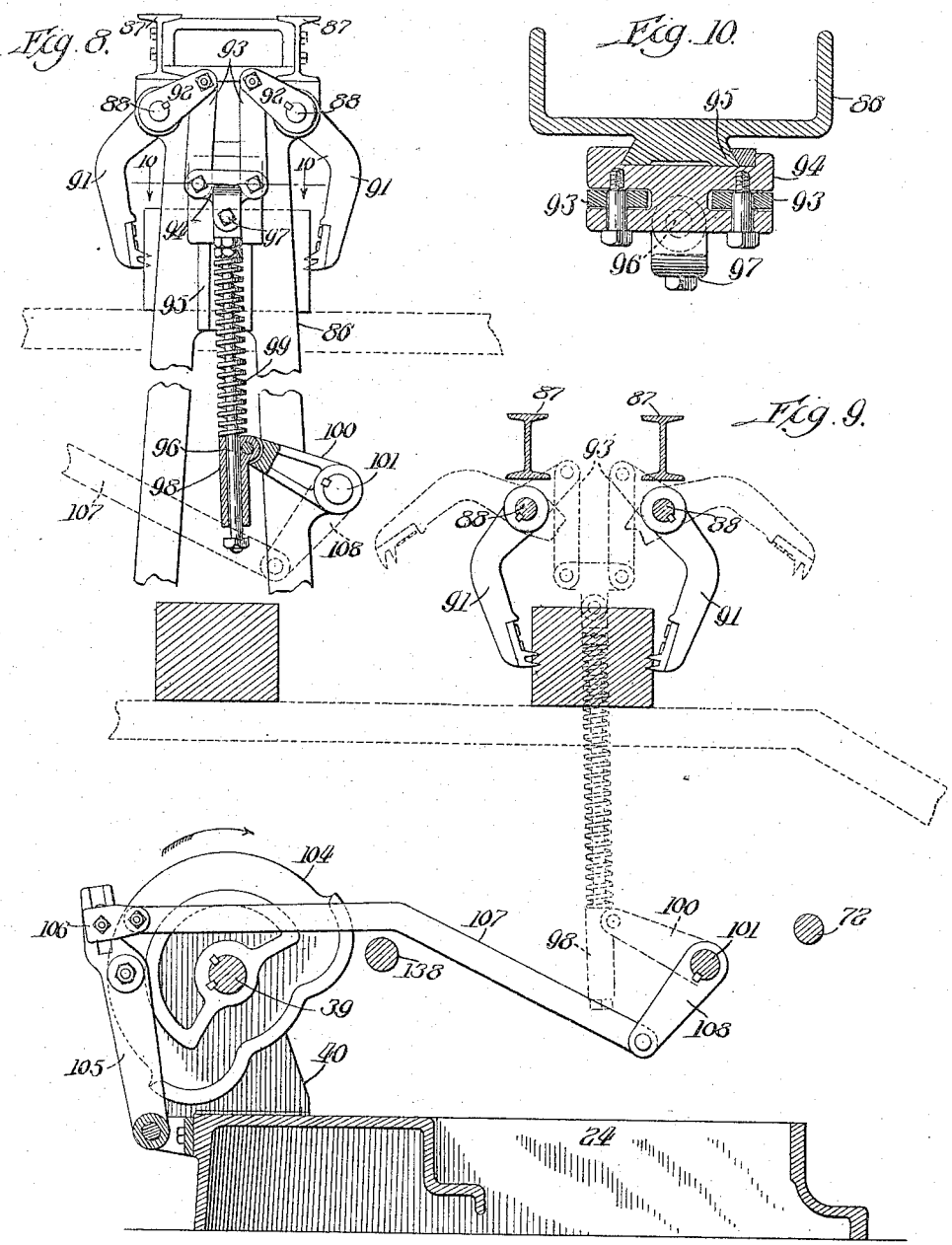

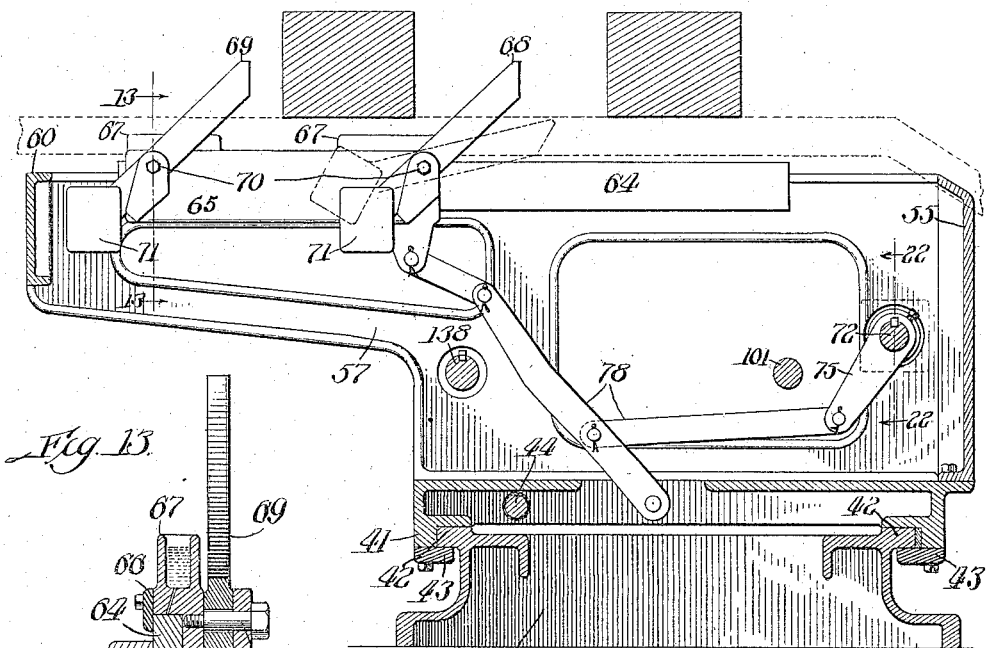

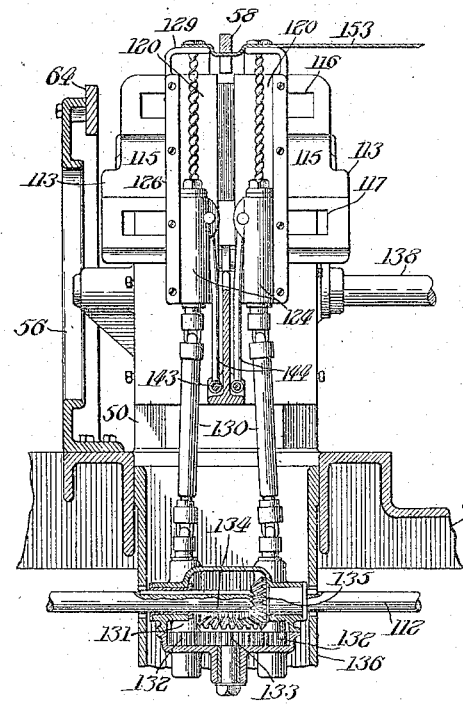

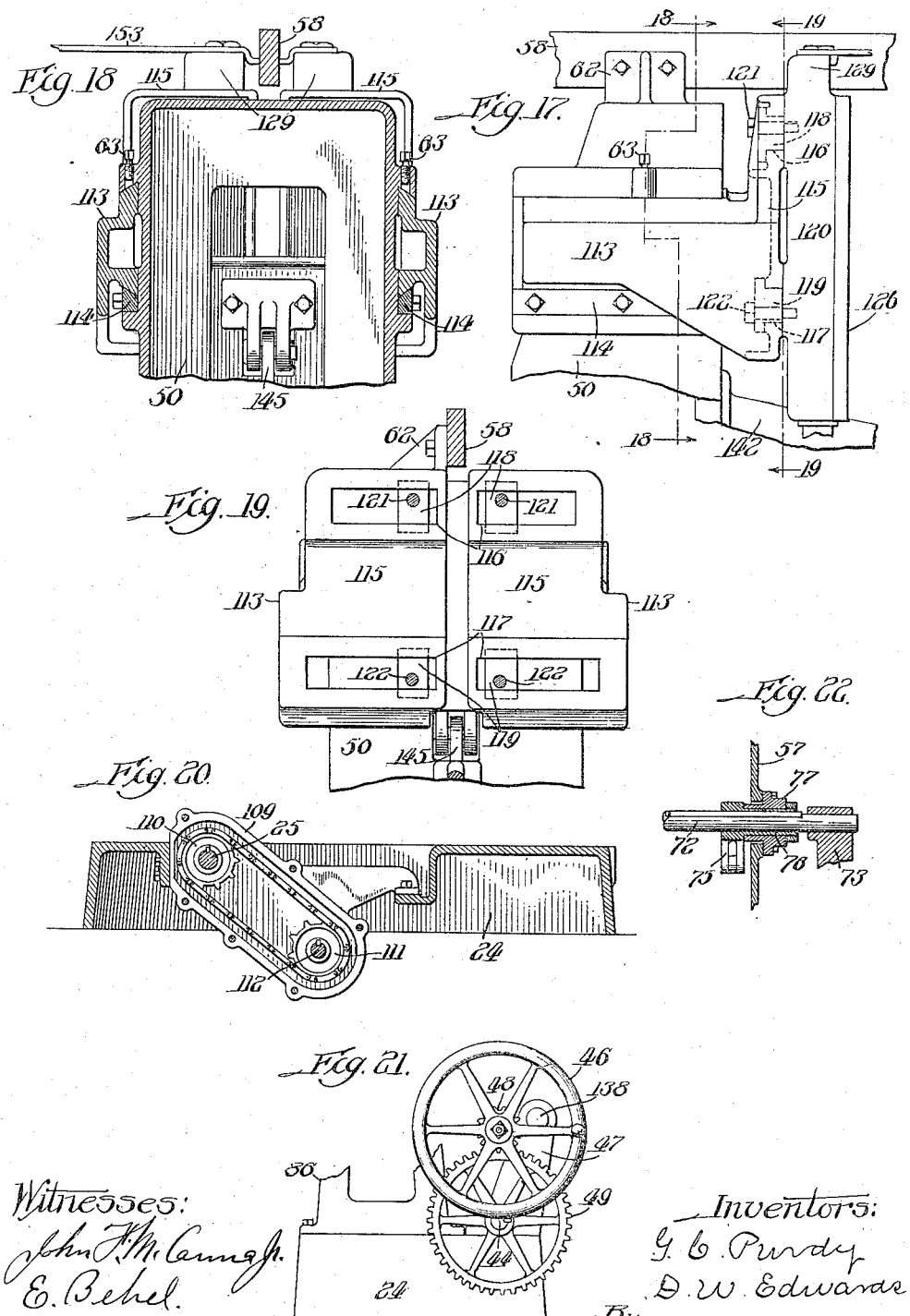

UNITED STATES PATENT OFFICE.

GEORGE C. PURDY AND DANIEL W. EDWARDS, OF ROCKFORD, ILLINOIS, ASSIGNORS TO GREENLEE BROS. & COMPANY, OF ROCKFORD, ILLINOIS, A CORPORATION OF ILLINOIS.

TIE-BORING MACHINE.

1,195,852.      Specification of Letters Patent.      Patented Aug. 22, 1916.

Application filed April 1, 1913. Serial No. 758,171.

*To all whom it may concern:*

Be it known that we, GEORGE C. PURDY and DANIEL W. EDWARDS, citizens of the United States, residing at Rockford, in the county of Winnebago and State of Illinois, have invented certain new and useful Improvements in Tie-Boring Machines, of which the following is a specification.

This invention relates to machines for boring holes in railroad-ties, adapted to receive the spikes which secure rails to the ties.

One of the objects of this invention is to construct a machine of this character which will be entirely automatic in its operations and which will be adjustable in order to bore holes in various positions and at various inclinations in the tie.

A further object is to construct a tie boring machine in which the tie actuating and boring means for operating upon one end of the tie, are mounted upon a carriage adjustable transversely to the feed of the tie through the machine.

A further object is to provide novel means for feeding, centering and boring the ties and to so mount the boring means that they shall be capable of adjustment to suit the various requirements of the machine and to so construct and arrange the various parts as to produce a highly efficient and adaptable machine.

Figure 4:
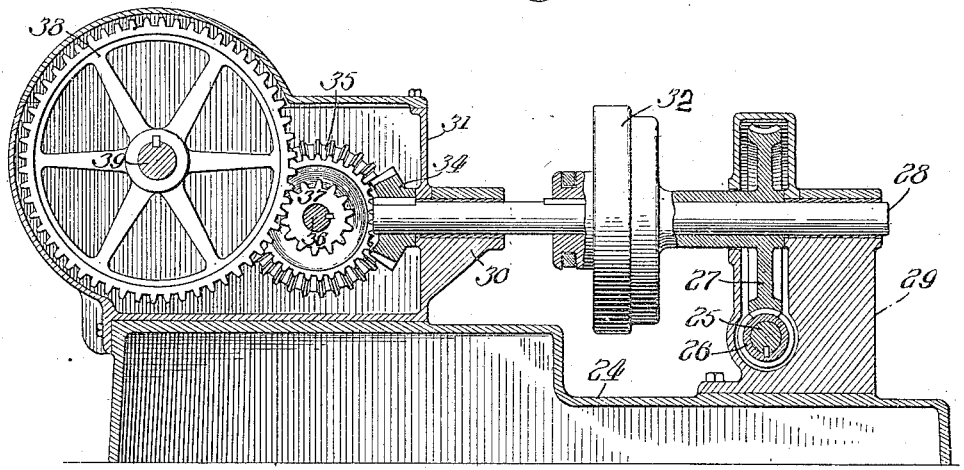
Figure 3:
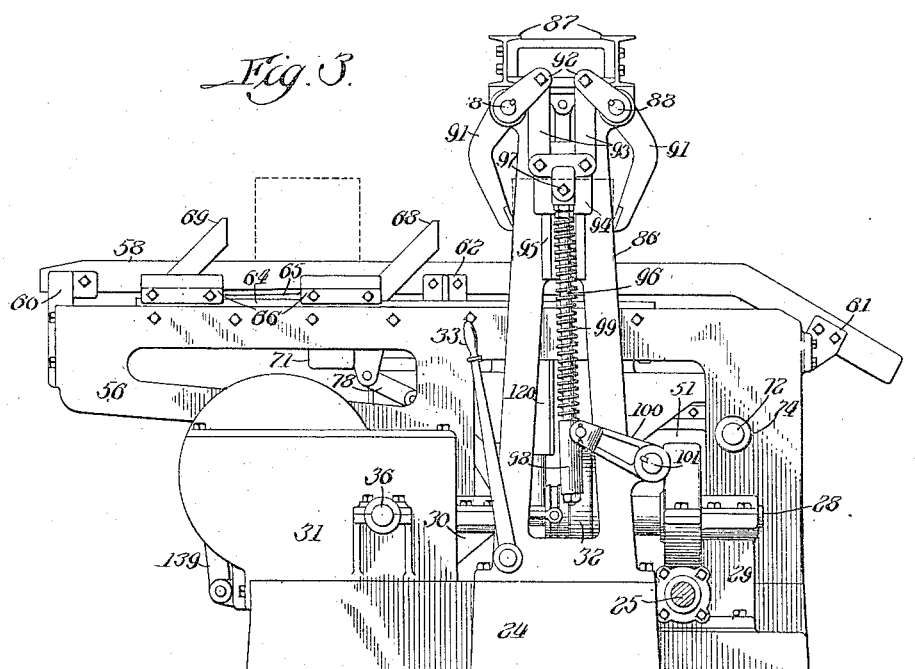

In the accompanying drawings, Figure 1 is a plan view of the tie boring machine. Fig. 2 is an elevation of the discharge side thereof. Fig. 3 is an elevation of the drive end of the machine. Fig. 4 is a section on line 4—4 of Fig. 1 showing the drive from the main shaft to the cam-shaft. Fig. 5 is a transverse section on the line 5—5 of Fig. 1 showing the stationary bit supports and cam in operation. Fig. 6 is a transverse section on the line 6—6 of Fig. 1 showing the adjustable carriage with the bit supports in elevation. Fig. 7 is an enlarged vertical section through the bit supporting head adjacent the cam which operates the same, and showing the bits in their lowered positions. Fig. 8 is an end view of the tie centering means showing a tie being centered, said tie being of more than average width. Fig. 9 is a transverse section on the line 9—9 of Fig. 1 (partly diagrammatic) of the tie centering means showing their application to a tie. Fig. 10 is a plan section on the line 10—10 of Fig. 8. Fig. 11 is a transverse section on the line 11 of Fig. 1 showing the means for feeding the ties. Fig. 12 is a transverse section on the line 12—12 of Fig. 1 showing the cam for operating said means. Fig. 13 is a vertical section on the line 13—13 of Fig. 11. Fig. 14 is a vertical section on the line 14—14 of Fig. 7. Fig. 15 is a similar section showing the bits swung to an angle. Fig. 16 is a plan section on the line 16—16 of Fig. 7. Fig. 17 is an enlarged side view of a bit support as shown in Fig. 7. Fig. 18 is a vertical section on the line 18—18 of Fig. 17. Fig. 19 is a vertical section on the line 19—19 of Fig. 17. Fig. 20 is a transverse section taken on the line 20—20 of Fig. 1 showing the drive between the main shaft and bit drive-shaft. Fig. 21 shows the drive means for adjusting the movable carriage. Fig. 22 is a vertical section on the line 22—22 of Fig. 11, and Fig. 23 is a vertical section on the line 23—23 of Fig. 1 showing a tie passing therethrough.

The rectangular base 24 forms the supporting means for the various devices. The initial drive-shaft 25 disposed longitudinally of said frame is constantly driven by any suitable means and has a worm 26, (Fig. 4) fixedly mounted thereon meshing with the worm-gear 27 loosely mounted upon the shaft 28 which is journaled at one end in the worm-gear casing and support 29, and at its other end in the journal-bracket 30 formed on the casing 31. The worm-gear 27 constantly driven by shaft 25, imparts rotary motion to shaft 28 through the friction-clutch 32 mounted on shaft 28, the clutch being operated by the hand lever 33 at the side of the machine. A beveled pinion 34 keyed to shaft 28 drives a beveled-gear 35 keyed to the stud-shaft 36 carried by casing 31, and a spur-gear 37 keyed to said shaft 36 drives a spur-gear 38 fixed on the cam drive-shaft 39 journaled in the casing 31 and the journal-bearing 40. This series of step down driving means is merely to reduce the speed of the cam-shaft while retaining the higher speed of the initial drive for actuating the boring bits.

The adjustable carriage, (Fig. 6 in section) has a base 41 which is mounted slidably upon the tracks 42 formed on the base 24 and extending longitudinally thereof, said carriage base being held in position upon the tracks by gib-plates 43. The carriage is moved over said tracks by the screw-shaft 44 engaging the screw-bracket 45 bolted to the base 41, said screw-shaft being rotated by an operator at the end of the machine opposite the driving end, by rotating hand-wheel 46 journaled in the support 47, the pinion spur-gear 48 rotating with said hand wheel and meshing with the spur-gear 49 keyed to the screw-shaft 44.

There are two pairs of header casings for supporting the bit mechanisms, the stationary casings 50 and 51 bolted to the base 24 and adjacent the driving end of the machine, and casings 52 and 53 bolted to the adjustable carriage base 41, the bit feeding mechanisms carried by each header casing being hereinafter described. Header shields 54 and 55 are bolted to the base 24 and the adjustable base 41 respectively, at the discharge side of the machine. To the outer sides of these header shields and bolted to their respective bases, are the tie slide-dog supporting casings 56 and 57 which extend transversely to the base of the machine and parallel with the direction of feed of the ties. Tie slide-rails 58 and 59 are located centrally above each pair of header-casings, parallel with the outside slide-dog casings, and are supported at their entrance end by the brackets 60 bolted to the outside casings 56 and 57, at their discharge end by the brackets 61 bolted to the header shields 54 and 55, and at a central point by the brackets 62.

There are three separate cam-actions operated by cam-shaft 39, to wit, tie sliding or feeding, tie centering, and the tie boring actions, all operating simultaneously, and we will explain the construction and operation of each one separately in the order named.

In Fig. 11 is shown the slide-dog of the adjustable carriage for feeding the ties, and in Fig. 12 is shown the cam for actuating same, and since the slide-dogs carried by both the outside casings 56 and 57 are similar, reference numerals as applied thereto will pertain to both devices. Guideways 64 are bolted to the inside of each of the casings 56 and 57 as shown in Fig. 13, and the dog-carriages 65 are mounted slidably thereon by the gib-plates 66, each dog-carriage being provided with receptacles 67 adapted to contain a solution to lubricate the guideways and dissolve pitch which is dropped on said guide-ways from ties passing overhead. Two dogs 68 and 69 are pivotally mounted on the dog-carriage on pivots 70, to the front and rear respectively and have counterweights 71 at their lower ends to hold them in an operative position, the heads of the dogs extending above the rails 58 and 59 in order to engage the ties. The rock-shaft 72 for actuating said dog-carriage is journaled at one end in the bearing support 73, at the other end in the journal-bearing 74 formed with the side casing 56, and also in the header-casing 51. The arm 75 mounted on rock-shaft 72 for actuating the dog-carriage for the adjustable carriage, is mounted slidably upon said shaft as shown in Fig. 22, the arm 75 having a sleeve 76 upon which is mounted the bracket 77 bolted to the side-casing 57, the collar screwed to the sleeve holding the arm with the bracket, and the said arm 75 being keyed to the shaft through a longitudinal key. The arm 75 actuates the slide-carriage 70 through the link 78 engaging the forward lower end of the slide-carriage, and an arm 79 fixedly secured to said rock-shaft 72 has a similar connection with the opposite slide-carriage. The slide-dog cam 80 is keyed to the cam-shaft 39 and a rocker-arm 81 pivotally supported at 82 carries a roller that lies in the cam groove, the rocker-arm having an adjustable connection 83 at its upper end with a rod 84 connected with an arm 85 keyed to rock-shaft 72, the rod 84 having a longitudinal adjustment as is shown in section. The cam 80 is shown in a position in which the dogs are inoperative and when the cam is rotated clock-wise the rise in the cam will feed the dogs forward with a quick movement and then return the dogs with a slow gradual movement.

The tie centering means are carried by the two upright standards 86 bolted to each end of the base and carry two channel-beams 87 forming an overhead support. Two rock-shafts 88 are carried at the drive end of the machine, journaled in the standard 86 and journal-bearings 89 bolted to I-beams 87. At the opposite end are similarly carried the two rock-shafts 90 which are longer than those formerly mentioned to allow for adjustments thereon in conformity with the adjustable carriage. Jaws 91 (enlarged Figs. 8 and 9) having teeth at their gripping end are fixedly secured to each of the rock-shafts 88 and 90 at points directly over the slide-rails 58 and 59. Keyed to each of the rock-shafts 88 and 90 to the outside of the standards are the converging bifurcated arms 92 which have a connection through links 93 with the reciprocable guide 94, the guide being mounted on the ways 95 formed with the standards. The tension rods 96 pivotally connected at 97 with the guide 94, carry sleeves 98 at their lower ends held thereon by nuts on the ends of the rods, the coiled springs 99 being carried on rods 96 between the sleeves 98 and pivotal connections 97. Bifurcated rocker-arms 100 have a pivotal connection with the sleeves 98 and are keyed to centering rock-shaft 101 which is journaled in bearings 102 formed with both of the standards, and also in the bearings 103 in the header-casing 51. The tie centering cam 104 keyed to cam-shaft 39 has a pivotal rocker-arm 105 carrying a roller in engagement with the cam groove of the cam, and the rocker-arm has an adjustable connection 106 at its upper end with which a bar 107 connects the rocker-arm 108 keyed to the rock-shaft 101. In this position of the machine, the centering-cam holds the jaws 91 clamped in engagement with a tie, and upon the rotation of said cam as indicated, the arm 105 will be carried toward the center of the cam thereby rocking shaft 101, to depress the guides 94 on the standards 86 by the tensional connection, and oscillate the jaws to inoperative position as shown in dotted lines on Fig. 9.

As ties often vary in width we have provided the novel tensional connections to allow all ties to be gripped with substantially the same force and to be accurately centered. The centering cam will rock the arms 100 similarly at every revolution of said cam, and in Fig. 8 we have shown an abnormally wide tie, being centered. It will be seen that arm 100 has retained its limited position while the extra play in the gripping operation is taken up in the spring 99 which allows the rod 98 to slide to compensate for the extra width of the tie, thus insuring the positive centering of ties of various widths.

The end of the main drive-shaft 25 opposite its driving end is journaled in the casing 109 which (as seen in Fig. 20) is bolted to the base 24 and incloses the chain drive between the sprocket-wheel 110 keyed to the main drive-shaft and sprocket-wheel 111 keyed to the shaft 112 which extends longitudinally below the center of the machine and drives the bits.

The bit mountings, adjustments and operations thereof are the same on each of the header-casings, except as to the vertical feed of the bits which is common to casings 50 and 52 only, but otherwise reference numerals will apply to like parts on every header. Spindle-guide supports 113 (in section Fig. 18) carried by and horizontally slidable on each side of the header-casings, are mounted on bevel-guides held in position by the gib-plates 114 and each of said spindle-guide supports is formed with a vertical end face portion 115 having upper and lower horizontal elongated openings 116 and 117 respectively, the said supports 113 being held in a set position by the set screws 63. Blocks 118 and 119 slidable in openings 116 and 117 respectively, support the spindle-guides 120 by the bolts 121 in the upper blocks screwed with said spindle-guides, and bolts 122 in the lower blocks, said bolts 122 having a head located in the slots 123 to allow the spindle-guides to be pivoted on the upper bolts 121. The spindle carriages 124 are held slidable longitudinally in the feathered guides 125 of the spindle-supports 120 (section Fig. 16) by the gibs 126, and carry journaled in bushings the rotatable bit spindles 127. Bits are screwed to the socket end of the spindles and are adapted to be fed through the guide-bolts 128 screwed to the heads 129 of the spindle-guides. Each spindle is driven through means of a telescoping keyed shaft and sleeve 130 having universal joints at their upper and lower ends, the shafts below the lower universal joints being journaled in casings 131 and have spur-pinions 132 meshing with a central driving spur-gear 133 formed with a beveled-gear 134 which meshes with the bevel-pinion 135 keyed to the bit-shaft 112. Casings 131 are supported in the shaving discharge casings 136 which are bolted to the base 24, and base 41.

The bit feed cam 137, shown in Fig. 5 in a position coincident with the above described cam actions, is keyed to cam-shaft 39 and imparts an oscillatory movement to the bit feed rock-shaft 138 journaled in the header casing 50 and journal support 47, through the medium of the pivoted lever 139 actuated by the cam face link 140, and the arm 141 keyed to said rock-shaft 138. The feed carriages 142 mounted to slide vertically on the header casings 50 and 52, carry the horizontal rods 143 upon which are mounted the links 144 (Fig. 14) having a pivotal connection with the spindle casings 124, the feed carriage for header 50 being reciprocated through means of link 145 pivotally connected to the carriage and rocker-arm 146 keyed to rock-shaft 138, and the feed carriage for header 52 is reciprocated in a similar manner except that the rocker-arm 146 is slidably keyed on the rock-shaft 138 in a similar manner to rocker-arm 75 as shown in Fig. 22, in order to allow for adjustment of the movable carriage 41. In Fig. 7 the cam is shown as having moved the bits to their lowest inoperative position and when the cam is further rotated the bits will be fed upward through the tie. As the strain on the cam parts is increased when feeding we provide means for diminishing this strain, comprising counter-weights 147 connected with rock-shaft 138 by the arms 148 and held in a substantially vertical position by links 149, the weights counter-acting the resistance to the feed of the bits.

Each bit is independently adjustable longitudinally and transversely of the machine, longitudinally by sliding the blocks 117 and 118 in the spindle-guide supports 115 and transversely by sliding said spindle-guide supports in the header casings. Also the spindle-guides may be pivoted on bolts 121 so as to operate at an angle as shown in Fig. 15 in order that bolts or screws inserted in the holes will have a greater holding quality in their application to the rails. By rotating hand-wheel 46 the carriage 41 is moved along the base and the bits carried by said carriage are adjusted bodily longitudinally of the tie to be operated upon. A templet 153 is used for guiding the boring bits and holding them in a true vertical position that they may enter and be fed into the tie in the correct position, since they have a tendency to run out when not thus supported. The templet is bolted to the spindle-guide heads 129 by the guide-bushings 128, different templets being used for different spacings of the holes to be bored.

Means for holding the ties down while holes are being bored are suspended above each set of bits, shown in an operative position in Fig. 23, and comprise brackets 150 bolted to the I-beams 87 and carrying rods 151 on which are pivotally supported a plurality of holding arms 152 graduated in length so as to adjust themselves to the varying heights of ties. One of the brackets of each set is set in advance of the other in order to widen the holding area of said means.

The operation of the machine upon the ties is as follows: Ties are placed upon the slide-rails 58 and 59 forward of the rear dogs 69 either by hand or by endless conveyers, and with the main drive-shaft 25 constantly driven, by operating the clutch lever 33 the cam-shaft 39 will be driven at a slow rate of speed while the bits will be rotated more readily and at the required speed by the direct drive from the main shaft. The tie carriage will then be fed forward by the cam 80 until the tie carried by the rear dog is just below the centering jaws, when said jaws will clamp and center the tie, being actuated by the cam 104 as above described. While the tie is thus held, the dogs will be returned slowly to their inoperative position, the front dog 68 when it passes the central tie, pivoting on its support as shown in dotted lines in Fig. 11, to pass under said tie. With the tie centered and held so, the bits will be fed upward as heretofore described, by the bit feed cam 137, and the holding means 152 will hold the tie, assisted by said centering jaws, in a rigid position. When the bits have been retracted the centering jaws will release the tie and a second tie having been placed on the side rails in front of the rear dogs, the slide carriage will again be moved forward, the forward dogs engaging the bored tie, carrying it along the slide-rails and discharging it therefrom, while the new tie will be positioned below the centering-jaws by said rear dogs. The action thereafter will be the automatic repetition of the several operations just described.

We claim as our invention.

1. In a boring machine, the combination with boring tools, of jaws for centering an article relative to the boring tools, means for actuating said jaws, and compensating means for transferring movement from said actuating means to the jaws whereby the jaws have a variable degree of closing according to the width of the article being centered.

2. In a boring machine, the combination with boring tools, of means for centering articles relative to said boring tools, means for automatically actuating said centering means, and a yielding means having connection with said actuating means and adapted to compensate for the variable degree of movement of said centering means.

3. In a boring machine, the combination with boring tools, of means for centering articles relative to said boring tools, means for intermittently actuating said centering means with an unvarying degree of action and means having a connection with said actuating means and adapted to allow the action of the centering means to be varied according to the width of the article being centered.

In testimony whereof we have hereunto set our hands in presence of two subscribing witnesses.

GEORGE C. PURDY.
DANIEL W. EDWARDS.

Witnesses:
A. O. BEHEL,
E. D. E. N. BEHEL.